United States Patent
Richardson

(10) Patent No.: US 8,568,256 B1
(45) Date of Patent: Oct. 29, 2013

(54) METHOD AND APPARATUS FOR INCREASING VISUAL PERFORMANCE OF ATHLETES

(76) Inventor: C. David Richardson, Hattiesburg, MS (US)

(*) Notice: Subject to any disclaimer, the term of this patent is extended or adjusted under 35 U.S.C. 154(b) by 254 days.

(21) Appl. No.: 13/068,233

(22) Filed: May 6, 2011

Related U.S. Application Data

(63) Continuation-in-part of application No. 12/313,310, filed on Nov. 20, 2008, now abandoned.

(51) Int. Cl.
*A63B 69/00* (2006.01)

(52) U.S. Cl.
USPC .......................................................... 473/451

(58) Field of Classification Search
USPC .................... 473/451–458, 598, 600–602
See application file for complete search history.

(56) References Cited

U.S. PATENT DOCUMENTS

| | | | |
|---|---|---|---|
| 1,994,703 A | 9/1935 | Hawes | |
| 3,415,589 A | 12/1968 | James, Jr. | |
| 4,128,238 A | 12/1978 | Newcomb et al. | |
| 4,408,846 A | 10/1983 | Balliet | |
| 4,991,838 A | 2/1991 | Groves | |
| 5,067,719 A | 11/1991 | Mook | |
| 5,305,027 A | 4/1994 | Patterson | |
| 5,592,245 A | 1/1997 | Moore et al. | |
| 5,607,152 A | 3/1997 | Strassburger | |
| 5,893,806 A | 4/1999 | Martinez | |
| 6,493,154 B1 | 12/2002 | Humphrey | |
| 6,612,942 B1 | 9/2003 | Battersby | |
| 6,631,987 B2 | 10/2003 | Reichow | |
| 6,663,519 B2 | 12/2003 | Kuhn et al. | |
| 6,893,127 B2 | 5/2005 | Reichow et al. | |
| 6,979,083 B2 | 12/2005 | Kerns et al. | |
| 7,326,060 B2 | 2/2008 | Seiller et al. | |
| 2005/0190341 A1 | 9/2005 | Russomagno et al. | |
| 2007/0093323 A1 | 4/2007 | Waldon | |
| 2008/0055541 A1 | 3/2008 | Coulter et al. | |

*Primary Examiner* — Mark Graham
(74) *Attorney, Agent, or Firm* — George L Williamson

(57) ABSTRACT

A method and apparatus for increasing the visual performance of athletes. For example, a baseball hitter is taught to recognize the spin of a thrown baseball and thus become a better hitter. A hitter wears eye glasses having lenses which are tinted in a color which is complementary to the a baseball being all or partially tinted in a complementary color. For example, the hitter may wear green tinted lenses to make the red seams of the thrown baseball become much more apparent. Various complementary color schemes are disclosed. Several examples of specific practice for use of the method and apparatus are disclosed. Examples of sporting activities in which color recognition is useful include baseball, shooting, soccer, racquetball, handball, volleyball, tennis and others.

20 Claims, 3 Drawing Sheets

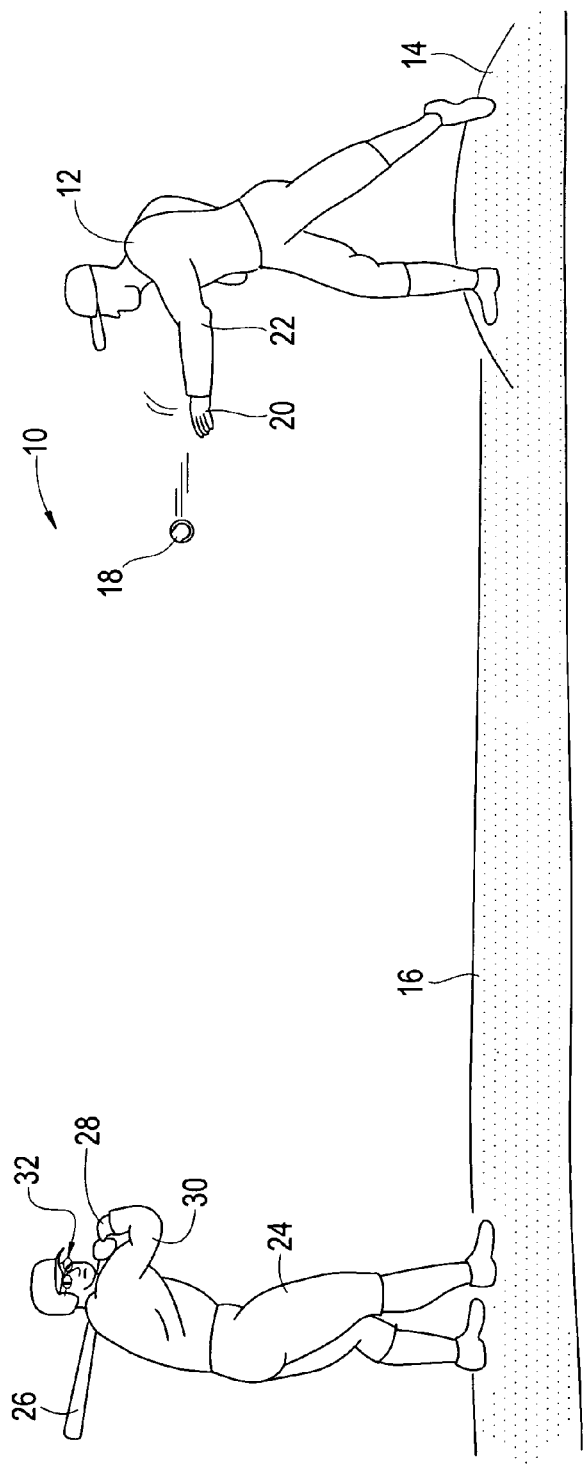
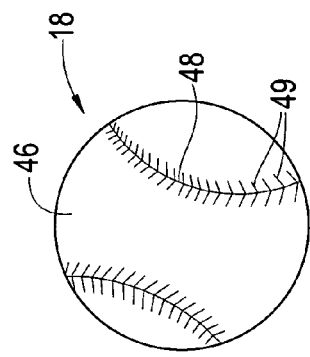
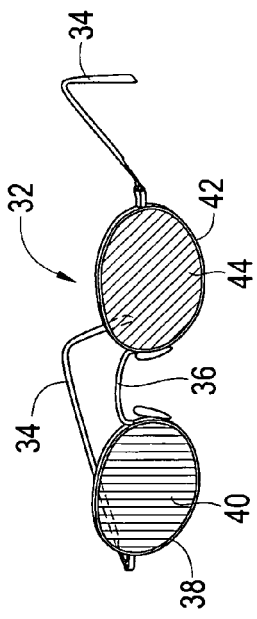
FIG. 1
FIG. 2
FIG. 3

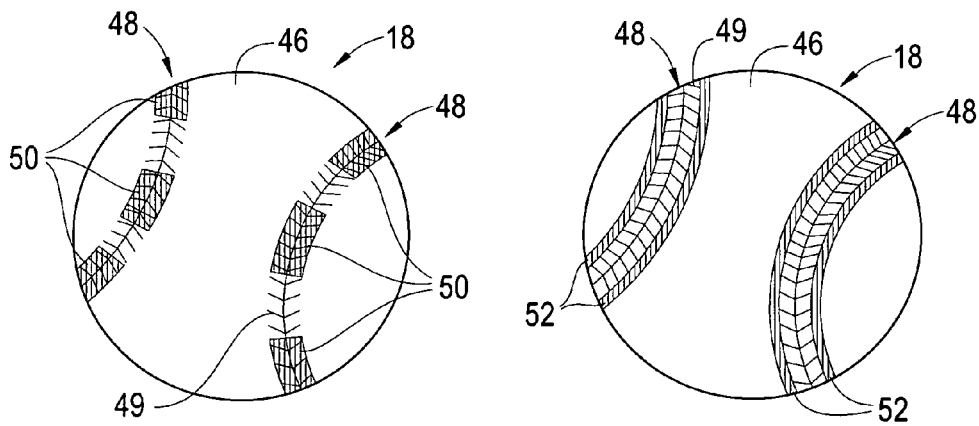
FIG. 8
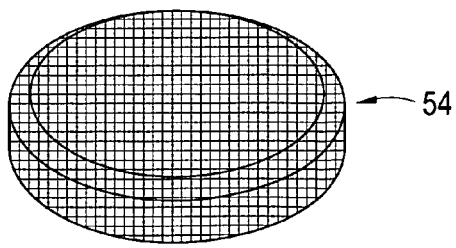
FIG. 9      FIG. 10
FIG. 11

METHOD AND APPARATUS FOR INCREASING VISUAL PERFORMANCE OF ATHLETES

RELATED APPLICATIONS

This is a Continuation-in-Part Application of U.S. patent application Ser. No. 12/313,310 filed on Nov. 20, 2008 now abandoned.

BACKGROUND OF THE INVENTION

1. Field of the Invention

The present invention relates generally to training methods and apparatuses for sports activities and, more particularly, is concerned with a method and apparatus for increasing visual performance related to sports activities, for example, teaching a baseball hitter to recognize the spin of a thrown baseball and thus become a better hitter.

2. Description of the Related Art

Methods and apparatus related to the present invention have been described in the related art, however, none of the related art devices disclose the unique features of the present invention.

In U.S. Pat. No. 5,607,152, dated Mar. 4, 1997 Strassburger disclosed a plurality of baseballs each having different colored indicia for training baseball hitters and a method for use. In U.S. Pat. No. 4,991,838 dated Feb. 12, 1991, Groves disclosed a mock baseball cover as training aide and method for use. In U.S. Pat. No. 7,366,060 dated Mar. 5, 2005, Seiller, et al., disclosed a visual performance evaluation and training system. In U.S. Patent Application Publication 2007/0093323 dated Apr. 26, 2007, Waldon disclosed a ball for racquetball with training markings. In U.S. Pat. No. 5,893,806 dated Apr. 13, 1999, Martinez disclosed a batting instruction method and apparatus. In U.S. Pat. No. 5,067,719 dated Nov. 26, 1991, Mook disclosed a spin-communicating ball. In U.S. Pat. No. 4,408,846 dated Oct. 11, 1983, Balliet disclosed a method and apparatus for increasing visual acuity.

While these methods and apparatuses may be suitable for the purposes for which they were designed, they would not be as suitable for the purposes of the present invention as hereinafter described.

SUMMARY OF THE PRESENT INVENTION

The present invention discloses a method and apparatus for increasing the visual performance of athletes. For example, a baseball hitter is taught to recognize the spin of a thrown baseball and thus become a better hitter. A hitter wears eye glasses having lenses which are tinted in a color which is complementary to the a baseball being all or partially tinted in a complementary color. For example, the hitter may wear green tinted lenses to make the red seams of the thrown baseball become much more apparent. Various complementary color schemes are disclosed. Several examples of specific practice for use of the present invention are disclosed. Examples of sporting activities in which color recognition is useful include baseball, hunting, shooting, soccer, racquetball, handball, volleyball, soccer and others.

An object of the present invention is to teach and/or train the athlete to pick up the spin and trajectory of the ball just a fraction of a second earlier, then the athlete would have a much better chance to make contact with the ball. Another object of the present invention is to provide a visual training system that can be used by hitters to teach them to recognize the ball flight characteristics and the spin of the breaking pitch as well as the fastball. Another object of the present invention is to provide a method for improving the visual performance of an athlete which can be easily and simply used. A further object of the present invention is to provide a method of increasing the visual performance of an athlete which can be easily and relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views:

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of a pitcher throwing a baseball to a batter.

FIG. 2 is a perspective view of a pair of glasses showing portions of the present invention.

FIG. 3 is a perspective view of a ball used with the present invention.

FIG. 8 is a chart showing combinations of colored lens which may be used with the present invention.

FIG. 9 is a perspective view of a ball showing portions of the present invention.

FIG. 10 is a perspective view of a ball showing portions of the present invention.

FIG. 11 is a perspective view of a skeet which may be used with the present invention.

LIST OF REFERENCE NUMERALS

Figure 4:
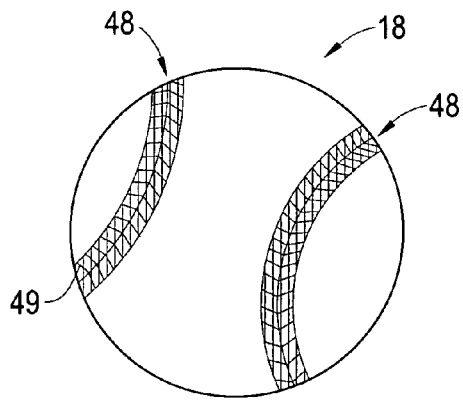
FIG. 4 is a perspective view of a ball used with the present invention.

With regard to reference numerals used, the following numbering is used throughout the drawings.

| | |
|---|---|
| 10 | present invention |
| 12 | pitcher |
| 14 | mound |
| 16 | ground |
| 18 | ball |
| 20 | arm |

| | |
|---|---|
| 22 | arm |
| 24 | batter |
| 26 | bat |
| 28 | hand |
| 30 | arm |
| 32 | glasses |
| 34 | ear piece |
| 36 | nose piece |
| 38 | right lens |
| 40 | color of right lens |
| 42 | left lens |
| 44 | color of left lens |
| 46 | cover of baseball |
| 48 | seam of baseball |
| 49 | stitches |
| 50 | segment |
| 51 | weight |
| 52 | parallel lines |
| 54 | skeet |
| 56 | enhanced checkered seam |
| 58 | rectangles or squares |
| 60 | dark colored portions |
| 62 | light colored portions |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 13 illustrate the present invention wherein a method and apparatus for increasing the visual performance of an athlete is disclosed.

By way of general explanation, the present invention is based on two optical and physiological principles. The first principle is based on the complementary colors concept. Certain pairs of colors are complementary which means that they can be additively combined to produce white light because together they complete the spectrum. When placed next to each other, complementary colors make each other appear brighter and more intense. The shadow of an object will also contain its complementary color. For example, the shadow of a red ball will contain green (red's complementary color). Examples of pairs of complementary colors are: RED (625-590 nanometers (nm)) and GREEN (500-565 nm); YELLOW (565-590 nm) and PURPLE (380-420 nm); BLUE (450-490 nm) and ORANGE (590-625 NM); and alternatively, a RED (625-740 nm) and CYAN (500-520 nm) pair, a GREEN (500-565 nm) and MAGENTA (a mixture of blue and red with no specific wavelength) pair are examples of more specific wavelength matched complementary color pairs.

The second principle that is utilized by the present invention is retinal photoreceptor desensitization or, more specifically, cone desensitization. This occurs when cone cells (retinal receptor cells that are responsible for color recognition) are fatigued by viewing a specific color. When one stares at a color (example: GREEN) for several seconds, its complementary color (example: RED) will appear much more visible because the cone cells become sensitized.

The present invention works by using, for example, green tinted lenses worn by a hitter/athlete to make the red seams of the baseball become much more apparent. Initial practice with this system will be done with a special baseball that has enhanced red seams. This system also uses a solid red ball with green tinted lenses to see the trajectory of the ball (the red ball will become much easier to see when visualized through the green lens). If one can teach the hitter/athlete to visualize the pattern of rotation of the breaking pitch and for that matter any pitch, he should be able to have a more educated guess of the speed and trajectory of the ball. This information should increase his chances of making contact with the ball. There are several drills that have been designed to use with this system that will be discussed later.

It should be noted that the present invention can be used with multiple sports which require recognition of an object such as a ball that can be made more visible using this principle. Another example would be the use of PURPLE lenses while observing a YELLOW tennis ball. There are also multiple uses of this complementary color system in any other activities in which color recognition is useful. Such examples are baseball, hunting, shooting, soccer, racquetball, handball, volleyball and others.

Any combination of lens colors and lenses may be used to achieve the training purposes that need to be attained.

The training system of the present invention teaches eye-muscle (referred to as "hand-eye") coordination and eye-brain coordination by repeatedly presenting exercises in order for the neurological system to memorize spin rotation and trajectory images. Once these amgrams are formed, the subconscious brain brings these images back to conscious brain without having to relearn them every time a pitch is thrown and needs to be recognized.

There are a special class of neurons called mirror neurons that have been discovered that reside in the brain. These neurons are responsible for memorizing goal-directed motor actions such as swinging a bat and eye movement that is required to track the flight of a ball. These same neurons also fire when the individual sees someone else performing the same task and thus have been termed mirror neurons.

Turning to FIG. 1, therein is shown a general illustration of the present invention 10 including a baseball pitcher 12 standing on a pitcher's mound 14 disposed on the ground 16 wherein the pitcher is in the process of pitching/throwing a baseball 18 which has just left his hand 20 of his arm 22 which is being thrown toward a batter/hitter 24 holding a bat 26 in the hands 28 of his arms 30 wherein the hitter is in the process of hitting the baseball, wherein the hitter is wearing a pair of eyeglasses 32 which can be used according to the teachings of the present invention. While FIG. 1 shows the present invention in the context of baseball, however, it should be understood that the present invention can be used for training shooters and tennis, racquetball, handball, volleyball and soccer players, wherein for a shooter a skeet (a disc-shaped object) would be launched, wherein for tennis, racquetball, handball and volleyball the ball would be served, and, wherein for soccer the ball would be kicked.

Turning to FIG. 2, therein is shown a pair of eyeglasses 32 having a frame comprising a pair of ear pieces 34 and a nose piece 36 thereon for being supported on the nose of a user having a right lens 38 having a unique color 40 which is shown as red in this example and a left lens 42 having a unique color 44 which is shown as green in this example. Any appropriate eye glass frame may be used with the present invention. The frames may be made of any material that is suitable such as plastic or metal. Certain frames are utilized that allow each (right or left) lens to be changed separately or both to be changed simultaneously. The lenses also can be made of any material that may be tinted or dyed or coated or altered to apply the specific color needed for the complementary color system of the present invention. A combination or any of the above methods may be used to attain the end result for the purpose of applying color to the lenses. The lenses may be shaped or altered to allow for addition of a vision correcting prescription that the subject may require. The present invention may also utilize red and green tinted lenses so that the green lens will be placed over the non-dominant eye and the red lens will be placed over the dominant eye so that the ball appears to disappear to the eye wearing the red lens (the dominant eye in this case) when using a ball that has been colored red. The eye with the green lens will be able to visualize the ball much more easily while the ball will be much less visible to the eye with the red lens. This combination of lenses will be used to isolate one eye for training purposes and thus further develop the non-dominant eye. The lenses can be used over either eye so as to isolate one eye for neurological/muscle memory training.

Note that if one is wearing a green or red lens on each eye then a white cover on a baseball will assume that color. In other words the white cover appears to the hitter, i.e., is apparently colored to the hitter, to be green when wearing a green lens and red when wearing a red lens. Also note that the complementary color (red when wearing a green lens or green when wearing a red lens) will be enhanced and the non-complementary color or same color (or apparent color to the hitter as explained above) relative to the lens (e.g., red when wearing a red lens or green when wearing a green lens) will seam to disappear to the hitter when using the teachings of the present invention.

Turning to FIG. 3, therein is shown a perspective of ball 18 having a cover portion 46 and a seam portion 48 with the seams being joined by multiple stitches 49. The ball 18 could be a baseball, tennis ball, racquetball, handball, volleyball or soccer ball.

Several types of balls have been developed which are used by this system.

Turning to FIG. 4, therein is shown a baseball 18 which has special continuous (i.e., not segmented along its length) enhanced red seams 48 along its length which are easier to visualize than standard seams. These enhanced seams 48 are continuous, and made wider than normal by using a red coloring agent to increase their width to be about as wide as the stitches 49. A regulation baseball, i.e., a conventional uncolored baseball, may be substituted as the hitter learns to recognize the breaking ball spin and trajectory.

Figure 5:
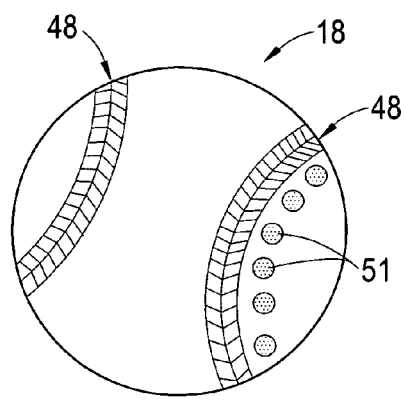
FIG. 5 is a perspective view of a ball used with the present invention.

Turning to FIG. 5, therein is shown a baseball 18 which was developed so that anyone, regardless of training, would be able to throw a breaking or curving pitch by using a fastball grip and motion that will spin in a manner similar to a breaking pitch. It is made by placing multiple sunken weights 51 that are oriented parallel to the horizontal seams 48 of the baseball 18. Also shown are stitches 49.

Figure 6:
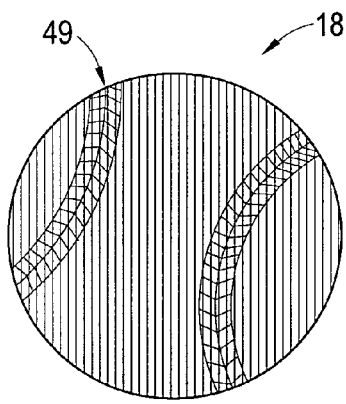
FIG. 6 is a perspective view of a ball used with the present invention.

Turning to FIG. 6, therein is shown a baseball 18 which is entirely colored red and is used in the trajectory drill (Example 3) with green tinted lenses. Also shown are stitches 49.

Figure 7:
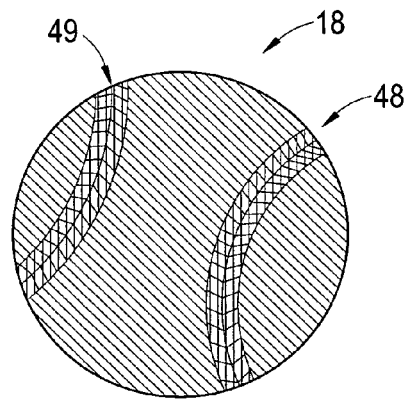
FIG. 7 is a perspective view of a ball used with the present invention.

Turning to FIG. 7, therein is shown a baseball 18 which is solid green in color with enhanced red seams 48. Also shown are stitches 49.

Turning to FIG. 8, therein is shown a chart which shows combinations of other ball coloring schemes which may be used to utilize the different colored lenses that may be interchanged for use with the present invention.

Turning to FIG. 9, therein is shown a perspective of baseball 18 having a cover portion 46 and a seam portion 48, wherein the seam portion is enhanced or wider and comprises a series of individual segments 50 about as wide as stitches 49.

Turning to FIG. 10, therein is shown a perspective of baseball 18 having a cover portion 46 and a seam portion 48, wherein the colored portions are a pair of spaced apart parallel lines 52 having the seams 46 visibly disposed between the lines which are about as wide as the stitches 49. It is expected that the parallel lines 52 would be red in color. It is expected that the cover portion 46 would be white or green in color.

Turning to FIG. 11, therein is shown a perspective of skeet 54, being shown as yellow colored, which is a disc-shaped target sometimes referred to as a clay pigeon used in shooting skeet.

Figure 12:
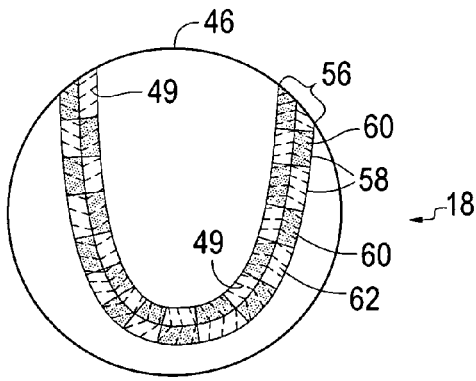
FIG. 12 is a perspective view of a ball used with the present invention.
Figure 13:
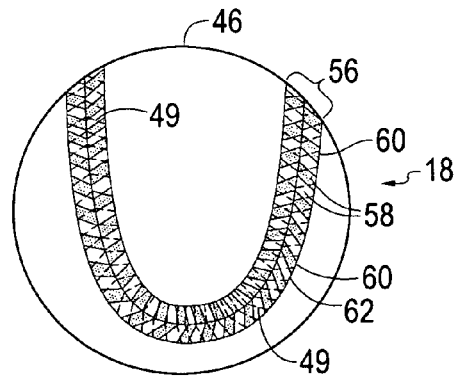
FIG. 13 is a perspective view of a ball used with the present invention.

Turning to FIG. 12, therein is shown a ball 18 having an enhanced checkered seam portion 56 being in the form of checkered rectangles or squares 58, i.e., alternating dark and white areas, wherein the cover 46 portion is white, green or red and the darkened enhanced rectangles 60 (shown in stipple shading) are red or green with the unpigmented portion 62 of the seam portion being white so that the red stitches 49 (dashed lines) are shown. The longer sides of the rectangles 58 are generally parallel to the seam portion. FIG. 13, shows a ball 18 similar to that shown in FIG. 12 except that the checkered portion is in the shape of parallelograms instead of rectangles or squares. The shorter sides of the parallelograms 58 are generally parallel to the seam portion.

Several specific hitting drills have been developed for the present invention which follow.

Example 1

This drill is a bilateral eye drill and is an important drill as it will teach the hitter to recognize the rotation patterns of the baseball. The green lenses and the enhanced seam baseball (also the weighted baseball, FIG. 5, with enhanced seams and the green baseball, FIG. 7, with enhanced red seams) are used for this drill.

The hitter wears the green tinted lenses on both eyes and the enhanced seam baseball is thrown in a manner to simulate different pitches. This is repeated several times with each type of pitch so that the hitter can learn to recognize the spin and rotation pattern for that pitch. Once the hitter learns to recognize the pitch rotation and pattern of rotation, then the instructor may vary the pitch thrown to test the hitter.

Example 2

This drill is used for training the dominant and, more importantly, the non-dominant eye. The hitter starts the drill by wearing the green lens on the right eye (for 90 percent of hitters their right eye is their dominant eye) and the red lens is worn on the left (non-dominant) eye. The enhanced seam baseball, FIG. 4, is thrown in a manner to simulate the breaking pitch. After several pitches the lenses are reversed and again several pitches are thrown. This drill utilizes the fact that when the red lens is worn the baseball seems to disappear while the green lens enhances the appearance of the baseball and its seams, thus isolating each eye for training purposes. This drill teaches the non-dominant eye to be trained to focus on the ball and its spin and trajectory.

Example 3

This is a tracking and trajectory drill used to allow the hitter to more easily visualize the ball flight characteristics of each type of pitch that is thrown. The green lenses are worn on both eyes and the solid red ball, FIG. 6, is used. The red ball is thrown so that the hitter may recognize the trajectory and flight of each type of pitch; i.e., breaking, fastball, etc. The green lenses make the red ball much more apparent. Also the green lens may be worn on the non-dominant eye and the red lens may be worn on the dominant eye to train the non-dominant eye to more easily track the ball. The green baseball with enhanced red seams, FIG. 7, may also be used in this drill.

Example 4

This training program begins with an enhanced seam baseball (white or green), then proceeds to the baseball having the colored lines spaced apart so that the seams are outlined in red, and, ends with a regular baseball. The batter wears the green tinted lenses during this drill. The idea is that the enhanced seam baseball will be the easiest to see, the outlined seam baseball easier to see than a regular baseball, and, finally a regular baseball which will be the hardest to see. In practice the seams will be easier or harder to see and the hitter practices with the easiest baseball/seams to see and then proceeds to the most difficult to see.

I claim:

1. A method for increasing the visual performance of a batter, comprising the steps of:
   a) pitching a series of baseballs to the batter;
   b) wherein the baseballs each have a cover portion and a seam portion, the seam portion comprising seams and stitches;
   c) wherein the seam portion of the baseballs is enhanced by having red seams made wider by using a red coloring agent to increase the width thereof to be about as wide as the stitches for the batter to better distinguish the seam portion from the cover portion of the baseballs; and,
   d) highlighting spin of a ball approaching the batter by providing eyeglasses to the batter with which to observe the pitched baseball, wherein the eyeglasses have left and right lens, wherein each lens comprises a different color, one color to make the seam portion become more apparent to the batter while the other color makes the ball less visible, wherein the batter is better able to recognize the spin of each incoming baseball, and wherein the visual performance and the batting performance of the batter are thereby improved.

2. The method of claim 1, wherein the cover portion of the baseball is white, wherein the cover portion would seem to disappear to the batter.

3. The method of claim 1, wherein the cover portion of the baseball is red.

4. The method of claim 1, wherein the cover portion of the baseball is green, wherein the cover portion would seem to disappear to the batter.

5. The method of claim 2, wherein the seam portion is colored to comprise a continuous enhanced seam.

6. The method of claim 2, wherein the seam portion is colored to comprise an enhanced segmented seam.

7. The method of claim 1, wherein the seam portion is colored to comprise a continuous enhanced seam.

8. The method of claim 1, wherein the seam portion is colored to comprise an enhanced segmented seam.

9. The method of claim 1, wherein either the left or right lens of the eyeglasses comprises a color chosen from the group red or green, and the other lens of the eyeglasses comprises a color complementary thereto.

10. A method for increasing the visual performance of a batter, comprising the steps of:
    a) pitching a series of baseballs to the batter;
    b) wherein the baseballs each have a cover portion and a seam portion, the seam portion comprising seams and red stitches;
    c) wherein the seam portion of the baseballs comprises an enhanced checkered seam portion about as wide as the stitches having alternating dark and light areas, wherein the dark areas are red, wherein the light areas are white allowing the red stitches to be visible;
    d) wherein the cover portion comprises a first color; and,
    d) providing eyeglasses to be worn by the batter with which to observe the pitched baseball, wherein the eyeglasses have left and right lens, wherein each lens comprises the color green, wherein the visual performance and the batting performance of the batter are improved.

11. The method of claim 10, wherein the enhanced checkered seam portion is substantially rectangular shaped.

12. The method of claim 10, wherein the enhanced checkered seam portion is substantially parallelogram shaped.

13. The method of claim 10, wherein the first color is white.

14. The method of claim 10, wherein the first color is red.

15. The method of claim 10, wherein the first color is green.

16. A method for increasing the visual performance of a batter, comprising the steps of:
    a) pitching a series of baseballs to the batter;
    b) wherein the baseballs each have a cover portion and a seam portion and a plurality of weights disposed internal to the baseball underneath and parallel to the seam portion so as to cause the baseball to curve;
    c) wherein the cover portion and the seam portion of the baseballs comprise the color red; and,
    d) providing eyeglasses to be worn by the batter with which to observe the pitched baseball, wherein the eyeglasses have left and right lens, wherein each lens comprises the color green, wherein the visual performance and the batting performance of the batter are improved.

17. A method for increasing the visual performance of a batter, comprising the steps of:
    a) pitching a baseball to the batter;
    b) wherein the baseball has a cover portion and a seam portion;
    c) wherein the cover portion comprises the color green;
    d) wherein the seam portion comprise the color red for the batter to distinguish the seam portion from the cover portion of the baseball;
    e) providing eyeglasses to be worn by the batter with which to observe the pitched baseball, wherein the eyeglasses have left and right lens, wherein the lens over a dominant eye of the batter is green and the other lens is red for isolating each eye for training purposes;
    f) pitching the baseball a few times;
    g) reversing the lens so that the green lens covers the non-dominant eye of the batter; and
    h) pitching the baseball a few more times whereby the non-dominant eye is trained to focus on the ball and its spin and trajectory.

18. A method for increasing the visual performance of a batter, comprising the steps of:
    a) pitching a baseball to the batter;
    b) wherein the baseball comprises a cover portion and a seam portion;
    c) wherein the cover portion comprises the color red forming a red ball; and
    d) providing eyeglasses to be worn by the batter with which to observe the pitched baseball and highlight the spin of the ball, wherein the eyeglasses have left and right lens, wherein one lens comprises the color green and is worn over the non-dominant eye of the user which complements the color red to make details of the red ball much more apparent and the other lens comprises the color red and covers the dominant eye of the batter.

19. A method for increasing the visual performance of a batter, comprising the steps of:
   a) pitching a series of baseballs to the batter;
   b) wherein the baseballs each have a cover portion and a seam portion, the seam portion comprising seams and stitches;
   c) wherein the seam portion of the baseballs is enhanced by having red seams made wider by using a red coloring agent to increase the width thereof to be about as wide as the stitches for the batter to better distinguish the seam portion from the cover portion of the baseballs;
   d) wherein the baseball has a plurality of weights disposed internal to the baseball underneath and parallel to the seam portion so as to cause the baseball to curve; and
   e) providing eyeglasses to be worn by the batter with which to observe the pitched baseball, wherein the eyeglasses have left and right lens, wherein each lens comprises a color which complements the color red to make the seam portion become more apparent to the batter, wherein the batter is able to recognize the spin of each incoming baseball, and wherein the visual performance and the batting performance of the batter are thereby improved.

20. A method for increasing the visual performance of a batter, comprising the steps of:
   a) pitching a baseball to the batter;
   b) wherein the baseball has a cover portion and a seam portion in which the seam portion is enhanced with sunken weights;
   c) wherein the cover portion comprises the color green;
   d) wherein the seam portion comprise the color red for the batter to distinguish the seam portion from the cover portion of the baseball;
   e) providing eyeglasses to be worn by the batter with which to observe the pitched baseball, wherein the eyeglasses have left and right lens, wherein each lens comprises the color green which complements the color red to make the seam portion to become more apparent to the batter; and
   f) throwing the baseball repeatedly in a manner to simulate different pitches so that the batter is able to recognize the spin of the incoming baseball, wherein the visual performance and the batting performance of the batter are thereby improved.

* * * * *